(No Model.)
H. D. LAYMAN.
SEED SOWER.
No. 296,699. Patented Apr. 8, 1884.
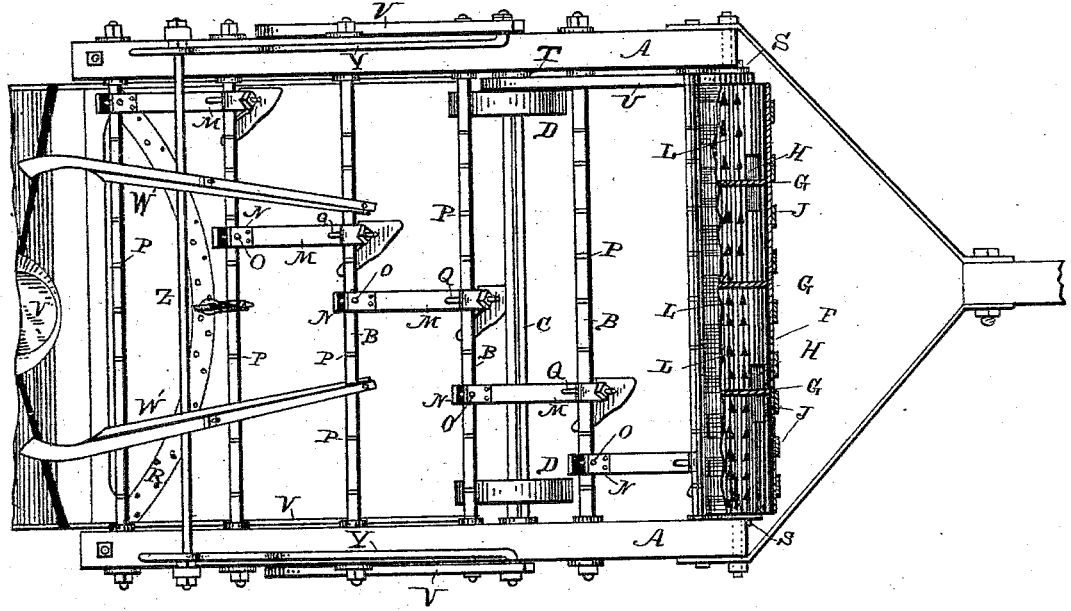
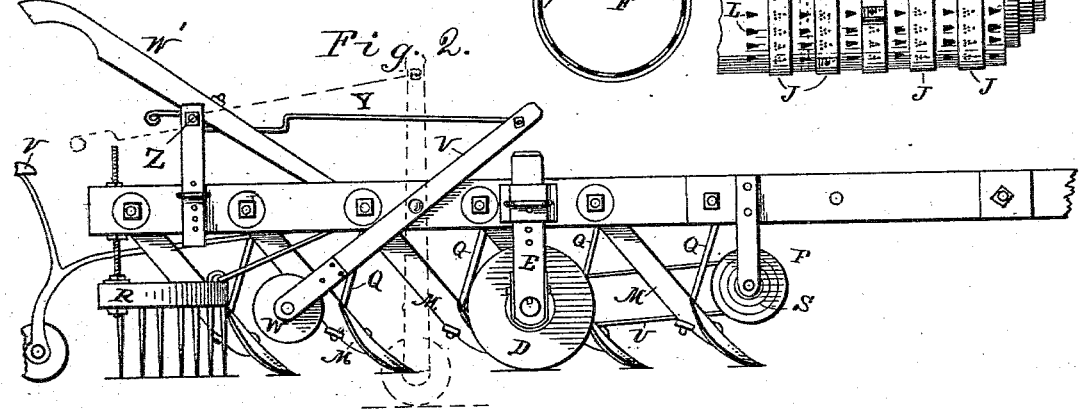
WITNESSES:
Thos. Houghton.
A. G. Lyne
INVENTOR:
H. D. Layman
BY Munn & Co.
ATTORNEYS.

UNITED STATES PATENT OFFICE.

HIRAM D. LAYMAN, OF BENTON, ARKANSAS.

SEED-SOWER.

SPECIFICATION forming part of Letters Patent No. 296,699, dated April 8, 1884.

Application filed November 16, 1883. (No model.)

*To all whom it may concern:*

Be it known that I, HIRAM D. LAYMAN, of Benton, in the county of Saline and State of Arkansas, have invented a new and useful Improvement in Seed-Sowers, of which the following is a full, clear, and exact description, reference being had to the annexed drawings, forming part of this specification.

This invention relates to seed-sowers, in which a perforated rotary cylinder is employed for distributing the seeds over the ground; and the invention consists of the novel construction hereinafter described and claimed.

In the drawings, Figure 1 is a broken plan view of my improved seed-sower, the seat-supporting frame being partly broken away. Fig. 2 is a side elevation of the same. Fig. 3 is a cross-section of the sowing-cylinder, and Fig. 4 is a partial elevation of the same.

The frame-work of the sower consists of the side beams, A, and cross-rods B. This frame is supported on an axle, C, and two wheels, D, the axle being journaled in vertically-adjustable hangers E. The sowing-cylinder F is formed with three transverse partitions, G, and two openings, H, opposite to two of the partitions, and leading into the four compartments of the cylinder formed by the partitions. These openings, through which the cylinder is to be filled with seed, are provided with hinged doors I, which are held closed by the cut bands J. The bands J are secured around the cylinder F by set-screws K passing through flanges at the ends of the bands, and these bands, by which they may be set to hold the doors firmly closed, are capable of being moved along the cylinder longitudinally for the purpose of covering or uncovering more or less of the holes L in the cylinder, through which the seeds are sifted out upon the ground as the cylinder is rotated. By means of the bands the cylinder may be made to sow in drills, or broadcast, as may be required. This cylinder is shown as arranged at the front of the frame, and behind it are arranged five plows, M, for turning up the soil and covering the sown seeds. These plows are attached to the cross-rods B by means of clips N and bolts O, which engage with the notches P in said rods, and by stay-rods Q secured to the next rod B in front of each particular plow.

At the rear of the frame behind the plows is a harrow, R. If desired, the cylinder F may be arranged behind, instead of before, the plows, and the harrow may be used for covering the seeds. The cylinder is provided with a series of pulleys, S, at each end, and is geared with a pulley, T, on the axle C by a belt, U. The axle may be provided with a pulley at each end to correspond with the pulleys S. As the pulleys S are to be of different sizes the speed of the cylinder may be varied according to the adjustment of the belt from one pulley S to another.

V V are pivoted bars carrying rollers W, and adapted to be thrown to the position shown in dotted lines for supporting the plows and wheels above ground.

Y Y are rods adapted to engage with a cross-bar, Z, to hold the bars V in any desired position.

V' is a carriage connected to the rear of the sower for supporting the driver, who is to control the sower by means of the handles W', the latter being shown as adjustable in height.

The main frame-work shown in the drawings, which is not claimed in this application, is covered by my application No. 111,322, filed November 9, 1883.

What I claim is—

The combination of the seed-sowing cylinder having perforations therein, and transverse partitions G, the doors I, each opening to two compartments formed by said partitions, and a series of cut-off bands, J, having set-screws K, to adapt them for being set to hold the doors firmly closed, and to regulate the discharge of seed, substantially as shown and described.

HIRAM D. LAYMAN.

Witnesses:
 A. G. LYNE,
 SOLON C. KEMON.